US008845906B2

(12) United States Patent
Henley

(10) Patent No.: US 8,845,906 B2
(45) Date of Patent: Sep. 30, 2014

(54) PROCESS FOR SINGLE SYSTEM ELECTROCOAGULATION, MAGNETIC, CAVITATION AND FLOCCULATION (EMC/F) TREATMENT OF WATER AND WASTEWATER

(71) Applicant: Don E. Henley and Associates, LLC, Denton, TX (US)

(72) Inventor: Donald E. Henley, Denton, TX (US)

(73) Assignee: Don E. Henley and Associates, LLC, Denton, TX (US)

( * ) Notice: Subject to any disclaimer, the term of this patent is extended or adjusted under 35 U.S.C. 154(b) by 0 days.

(21) Appl. No.: 13/718,393

(22) Filed: Dec. 18, 2012

(65) Prior Publication Data

US 2013/0161262 A1 Jun. 27, 2013

Related U.S. Application Data

(60) Provisional application No. 61/630,996, filed on Dec. 23, 2011.

(51) Int. Cl.
| | |
|---|---|
| *C02F 9/12* | (2006.01) |
| *B03C 1/30* | (2006.01) |
| *B04C 9/00* | (2006.01) |
| *C02F 9/00* | (2006.01) |
| *C02F 1/34* | (2006.01) |
| *C02F 1/20* | (2006.01) |
| *C02F 1/38* | (2006.01) |
| *C02F 1/48* | (2006.01) |
| *C02F 1/463* | (2006.01) |

(52) U.S. Cl.
CPC ... *C02F 9/00* (2013.01); *C02F 1/34* (2013.01); *C02F 1/20* (2013.01); *C02F 1/38* (2013.01); *C02F 1/481* (2013.01); *C02F 2209/06* (2013.01); *C02F 1/484* (2013.01); *C02F 2209/40* (2013.01); *C02F 2209/05* (2013.01); *C02F 2201/008* (2013.01); *C02F 1/463* (2013.01)
USPC ........... 210/806; 210/800; 210/804; 210/695; 210/787; 210/746; 210/742; 210/743; 204/267; 204/660; 204/664; 204/554; 204/557

(58) Field of Classification Search
USPC ............ 210/222, 223, 695, 167.29, 634, 702, 210/703, 708, 712, 718, 723, 742, 7, 43, 210/740, 746, 745, 748.01, 748.17, 748.16, 210/767, 768, 769, 776, 781, 787, 788, 790, 210/806, 805, 800, 803, 804, 194, 195.1, 210/196, 19, 252, 257.1, 258, 259, 295, 210/304, 512.1, 512.2, 513, 519, 532.1, 210/532.2, 538, 539, 540, 743; 204/267, 204/660, 664, 554, 557
See application file for complete search history.

(56) References Cited

U.S. PATENT DOCUMENTS

| | | | | |
|---|---|---|---|---|
| 5,505,857 A | * | 4/1996 | Misra et al. ................... | 210/709 |
| 5,928,493 A | * | 7/1999 | Morkovsky et al. .......... | 205/757 |

(Continued)

OTHER PUBLICATIONS

Discover, Water Wranglers, Round Table Discussion on the Future of Water; Discover Magazine, Dec. 2011; 17 pages.

*Primary Examiner* — David C Mellon
(74) *Attorney, Agent, or Firm* — Jackson Walker L.L.P.

(57) ABSTRACT

The current invention provides a novel process for the treatment and reclamation of drilling frac flowback and produced wastewater from the drilling industry. The wastewater is delivered to the EMC/F System from a frac tank or other reservoir. The wastewater is pumped into the system and is treated sequentially by passing through a mechanical hydrocavitation unit, an electromagnetic unit, an electrocoagulation unit and/or a hydrocyclone and a flocculation-sedimentation tank. Polishing of the final effluent is accomplished by passing the water through a mixed media tank.

12 Claims, 9 Drawing Sheets

ELEVATION VIEW

(56) References Cited

U.S. PATENT DOCUMENTS

| | | |
|---|---|---|
| 6,294,061 B1 * | 9/2001 | Morkovsky et al. .......... 204/242 |
| 6,780,292 B2 | 8/2004 | Hermann et al. |
| 6,919,031 B2 * | 7/2005 | Blumenschein et al. ..... 210/711 |
| 7,048,854 B1 * | 5/2006 | Lee et al. ................... 210/221.2 |
| 7,264,733 B2 * | 9/2007 | Matsunami et al. .......... 210/709 |
| 7,651,614 B2 | 1/2010 | Kelsey et al. |
| 7,695,623 B2 * | 4/2010 | Woodard et al. .............. 210/620 |
| 7,820,053 B2 * | 10/2010 | Cort ............................... 210/695 |
| 7,901,585 B1 * | 3/2011 | Lehtinen et al. .............. 210/670 |
| 8,210,456 B2 * | 7/2012 | Stevens ........................... 241/19 |
| 2006/0108273 A1 * | 5/2006 | Perri et al. .................... 210/275 |
| 2008/0135491 A1 * | 6/2008 | Cort ............................... 210/695 |
| 2013/0075335 A1 * | 3/2013 | Prakash et al. ................ 210/640 |

* cited by examiner

ELEVATION VIEW

Table 1 Testing Results for Frac Flowback Water From a Barnett Shale Gas Well

| Contaminant or Parameter | Before (mg/l) | RL | After (mg/l) | Redu |
|---|---|---|---|---|
| Total dissolved solids | 98900 | 20.0 | 29500 | 70.2 |
| Conductivity (uS/cm) | 121000 | 50000 | 43000 | 64.5 |
| Salinity | 87000 | 10000 | 27000 | 69 |
| or Anions |  |  |  |  |
| Bromide | 602 | 2.00 | 148 | 75.5 |
| Fluoride | 2.44 | 2.00 | 0.48 | 82.4 |
| Sulfates | BRL | 5.00 | BRL | -- |
| Sulfides | BRL | 5.00 | BRL | -- |
| Chlorides | 93700 | 2500 | 18300 | 80.5 |
| olved Metals |  |  |  |  |
| Arsenic | BRL | 0.010 | BRL | -- |
| Barium | 479 | 0.010 | BRL | >99.9 |
| Boron | 21.4 | 0.100 | 5.07 | 76.4 |
| Cadmium | BRL | 0.005 | BRL | -- |
| Calcium | 4920 | 0.100 | 1240 | 75 |
| Chromium | BRL | 0.005 | BRL | -- |
| Copper | BRL | 0.010 | BRL | -- |
| Iron | 32.3 | 0.030 | BRL | >99.9 |
| Lead | BRL | 0.012 | BRL | -- |
| Magnesium | 510 | 0.010 | 12.3 | 97.6 |
| Manganese | 0.249 | 0.010 | 0.129 | 48.2 |
| Sodium | 38600 | 0.500 | 8380 | 78.3 |
| ogen |  |  |  |  |
| Ammonia | 184 | 0.500 | 56.4 | 69.4 |
| X-MTBE |  |  |  |  |
| MTBE | BRL | 0.0050 | BRL | -- |
| Benzene | 0.0163 | 0.0010 | BRL | >93.9 |
| Toluene | 0.0041 | 0.0010 | BRL | >75.7 |
| Ethyl benzene | BRL | 0.0010 | BRL | -- |
| M,P-Xylene | BRL | 0.0020 | BRL | -- |
| O-xylene | BRL | 0.0010 | BRL | -- |
| Total Zylenes | BRL | 0.001 | BRL | -- |
| Total BTEX | 0.0204 | 0.001 | BRL | >95.1 |
| l (Total Petroleum Hydrocarbons) |  |  |  |  |
| $C_6$-$C_{12}$ | BRL | 4.36 | BRL | -- |
| $C_{12}$-$C_{28}$ | BRL | 4.36 | BRL | -- |
| $C_{?}$-$C_{?8}$ | BRL | 4.36 | BRL | -- |
| Total TPH | BRL | 4.36 | BRL | -- |

Symbols and Abbreviations: reporting limit ("RL"); below reporting limit ("BRL")

Figure 6

Table 2 EMC/F BIOCIDAL Treatment of Frac Source Water

EMC/F Biocidal Treatment of Two Frac Source Waters

| Source No.1 | | Source No.2 | |
|---|---|---|---|
| Physico-chemical Data | | Physico-chemical Data | |
| pH | 8.17 | pH | 7.72 |
| Tds | 293 ppm | Tds | 1424 ppm |
| Salinity | 290 ppm | Salinity | 1460 ppm |
| ORP | 37.3 | ORP | 59 |
| Temp. | 80.27°F | Temp. | 88.9°F |

Raw Water Bacterial Count- 5x10$^4$ per ml    Raw Water Bacterial Count- 1.6x10$^5$ Post EMC/F Treatment Bacterial Count[1]    Post EMC/F Bacterial Treatment

| No. of Passes[2] | Count | % Red. | Post Biocide | No. of Passes[2] | Count | % Red. | Post |
|---|---|---|---|---|---|---|---|
| 1 | 2.2x10$^3$ | 96 | 0* | 1 | 2.0x10$^4$ | 87.5 | 0** |
| 2 | 2x10$^2$ | 99.6 | 0* | 2 | 1.8x10$^3$ | 98.9 | |
| 0** | | | | | | | |
| 3 | 0 | 100 | | 3 | 0 | 100 | |
| 0** | | | | | | | |

Notes
[1] Denotes that concentrations and results are averages for duplicate samples.
[2] Denotes number of passes THROUGH a one foot EC cell.
* Denotes treatment with CHLORINE at 10 ppm and a detention time of 15 min. post EMC/F treatment.
** Denotes treatment with chlorine at 5 ppm and a detention time of 30 min. post EMC/F treatment.

Figure 7

Table 3    EMC/F Treatability of Various Chemical Constituents

| Chemical Constituent Parameter | EMC/F Treatability + | GAC |
|---|---|---|
| pH | x | |
| Hydrogen Sulfide | x | |
| CO₂ | x | |
| Volatile Organic Carbons (BETX) | x | x |
| Oil/Grease | X** | x |
| Polymers | X** | x |
| Phosphates | x | |
| Total Alkalinity | x | |
| Chloride | X** | |
| Fluoride | x | |
| Sulfide | x | |
| Boron | X** | |
| Sulfate | X** | |
| Conductivity | X** | |
| Total Dissolved Solids | X** | |
| Total Suspended Solids | x | |
| Salinity | NA | |
| Aluminum | x | |
| Arsenic | x | |
| Barium | x | |
| Cadmium | x | |
| Calcium | x | |
| Chromium | x | |
| Copper | x | |
| Iron | x | |
| Lead | x | |
| Magnesium | x | |
| Manganese | x | |
| Potassium | X** | |
| Sodium | X** | |
| Strontium | x | |
| Mercury | x | |
| Nickel | x | |
| Silica | x | |
| Bacteria and Algae | x | |

GAC – Granular Activated Carbon x  Significant reductions to meet reuse requirements
X*  Concentration should not exceed 2% - 3% of water volume X**  Reductions are variable and depends on initial water concentrations

Figure 8

PROCESS FOR SINGLE SYSTEM ELECTROCOAGULATION, MAGNETIC, CAVITATION AND FLOCCULATION (EMC/F) TREATMENT OF WATER AND WASTEWATER

RELATED APPLICATIONS

This application claims priority to a U.S. Provisional Application No. 61/630,996 filed on Dec. 23, 2011 having Donald E. Henley listed as inventors, the entire content of which is hereby incorporated by reference.

FEDERALLY SPONSORED RESEARCH

Not Applicable.

JOINT RESEARCH AGREEMENTS

Not Applicable.

SEQUENCE LISTING

Not Applicable.

BACKGROUND OF THE INVENTION

The present invention relates to a process for the hydro-cavitation, electromagnetic, electrocoagulation, hydrocyclone and flocculation treatment of water and wastewater for purposes of reuse. Water covers more than 70% of the earth's surface. But only 2.5% is freshwater. Two-thirds of that is locked up in ice caps and glaciers. Freshwater accessible in lakes, rivers, and streams is just six-thousandths of one percent of the world's total water. Climate change, drought, population growth and pollution are stressing the planet's freshwater supply. This will most likely mean that politicians, scientists and the general public will have to make tough choices to adapt to a world where water could outstrip fuel as the most prized commodity.

In March of 2012, it has been estimated that seven billion people were living on planet earth. They use nearly 30% of the world's total accessible and renewable supply of water. By 2025 this value may reach 70%. Yet billions of these same people lack basic water supply services; estimates of 5 million people die each year from water-related diseases (e.g., typhoid and cholera). Water has also become a basis for regional and international conflict.

A great deal of world-wide water use is non-consumptive which means the water is returned to the environment. Usually this water is contaminated with an array of contaminants, whether it is used for agriculture, domestic consumption, or by industry. The world's water supply problems are further complicated by increasing world population and pollution.

Wastewater treatment, recycling and reuse is an increasing necessity, as shortages, pollution and restriction on domestic users and commercial entities by government require that new, economically feasible and readily adaptable technologies be developed for increasing supply.

Industry produces an array of pollutants or contaminants. These include detergents, dyes, pharmaceuticals, petroleum products, oil, grease, heavy metals, biological and non-biological organic products, food and beverage wastes. These wastewaters are most often discharged directly to the sewer system, rather than treated and recycled for reuse by industry. In many cases, such discharge is waste of a valuable resource when one considers that technology is available to economically treat and recycle such wastewater streams.

In many parts of the world, especially developing countries, economical and readily adaptable methods to treat water for domestic consumption is severely lacking. Surface waters are often contaminated with untreated human and animal waste, water borne disease organisms, heavy metals and dangerous organic products, including petroleum. Groundwater from wells and boreholes is often contaminated with high concentrations of heavy metals, such as arsenic.

A wide range of wastewater treatment techniques are known. These include biological processes for nitrification, denitrification and phosphorus removal, as well as, a range of physico-chemical processes. The physico-chemical processes include filtration, ion exchange, chemical precipitation, chemical oxidation, carbon adsorption, electrocoagulation, ultrafiltration, reverse osmosis, electrodialysis, and photo-oxidation.

Treatment of wastewater by electrocoagulation ("EC") has been practiced for most of the twentieth century. It has achieved limited success in most instances. The technology is increasingly being used in Europe for the treatment of industrial wastewater containing heavy metals. In North America the EC process has been employed to treat wastewater from the pulp and paper industry, effluents from the mining industry and metals processing industry. This technology has been used to treat wastewater containing food stuffs, suspended particles, dyes, petroleum products, animal fats, landfill leachates, solutions of heavy metals, polishing compounds, phosphorus, organic matter, pesticides and synthetic detergents.

Electrocoagulation is the process that occurs within an electrolytic reactor or cell. The reactor is a cell containing an anode and a cathode. When connected to an external power supply, the anode is oxidized and the cathode is passivated and reduction occurs, producing gases such as hydrogen. In practice, the electrodes are usually parallel metal plates that serve as monopolar electrodes, which may be of the same or different metal. The electrodes are attached to a DC power supply that allows current and voltage adjustment. Under current flow to the anode, an appropriate metal is oxidized and cations of the metal are released into the flowing wastewater. The anode is referred to as the "sacrificial electrode", since it is ultimately consumed in the reaction. The ions produced in this reaction neutralize or destabilize contaminants within the wastewater, which allows them to coagulate and precipitate.

Known technology for such systems suffers from a number of disadvantages. These include:
  Lack of Adaptability. Most systems are designed for single purpose application and are fixed in their design for treating a specific wastewater contaminant and/or treating at a specific flow rate.
  Lack of Efficiency. Most systems lack the capability to efficiently treat a broad spectrum of wastewater contaminants.

Electricity has been used to treat and condition water since the late 1800's. Significant improvements have been made in treatment technology periodically over the last century. Current knowledge development and improvement in the water treatment art, demonstrated herein, has shown that the EMC/F System which incorporates Electrocoagulation, Magnetic, Cavitation and Flocculation subsystems provides a significant advance in water treatment technology. Significant research demonstration, testing, development and implementation show a novel and remarkably adaptable technology that can be appropriate for processing and treating various difficult-to-treat industrial wastewaters. Using the advanced EMC/F and traditional separation technologies, the consumption of chemicals and energy and associated costs for water treatment are significantly reduced. Such characteristics would allow EMC/F to be classified as a "Green Technology". In addition, the area dedicated to water treatment (plant footprint) for the EMC/F is smaller than for traditional technologies. The ultimate objective in many instances is that the treated water be clean enough to meet reuse standards in a facility or activity which would further reduce cost and allow conservation of treated water supplies and those of untreated supplies (rivers, reservoirs, and lakes).

History. Electrocoagulation and electroflocculation have been used by many industries over the last century, principally mining, metal finishing and fabrication. Energy companies developed high flow systems to treat the wastewater from coal slurry pipelines (Westinghouse, General Electric). Metal finishing industries have used both flow through and batch systems for several decades. Enviro-Chem (Monsanto) modified the Russian membrane EC technology that separates the anolyte (flow from anode) and catholyte (flow from cathode) with a porous ceramic membrane. Controlling the composition of the influents and the electrical currents allows the production of "activated" water that can be used to sterilize or treat wastewaters. The Germans were first to note the ability of electrically processed water to carry energy and provide treatment.

Electrical treatment of water has been practiced in several countries for many years. Eastern Europe, Germany and Argentina are notable for the use of electrical energy for various purposes in water treatment. Electroflocculation is often used for removal of suspended solids from surface water supplies prior to chemical treatment to produce drinking water. On occasion, an induced current is used to remove microbes as a final step in drinking water distribution. Electroflocculation is not widely used as the primary treatment for either drinking water or wastewater.

A well known characteristic of electrical energy is magnetism. Many boilers operate with electromagnets on the condensate return or feed water lines. The energy is critical to the prevention of scaling from calcium and magnesium in the feed water. A magnetic field of a precise force around the pipes has been shown to reduce scaling by controlling the speciation of these atoms as they precipitate from the water. The predominant species of calcium precipitated, post-magnetic treatment, is aragonite which does not form scale. Cavitation treatment, followed by Magnetic and Electrocoagulation treatments and finally Hydrocyclone treatment to remove larger floc particles is a unique and novel concept and process with all the above described technologies incorporated into a single system, as described herein. This single system is further known as the EMC/F technology.

As a technology with a long history and a well known capability, electrocoagulation has not been in the mainstream of water treatment. The high cost of replacing electrodes, the difficulties with production of reliable, steady state power and the general misunderstanding of electrical treatment have hindered its acceptance. In addition, a number of unscrupulous companies proliferated in the late 1990's promising miraculous treatments and not delivering quality equipment. The technology appears to be very simple and it is easy to effect treatment on bench scale or batch systems. Treatment with electricity is complex and many variables need to be addressed and accounted for to produce a successful full scale treatment unit.

In the following pages, the unique EMC/F technology will be described. This advanced system incorporates technologies with all of the physical, chemical and electrical concepts described. The EMC/F system utilizes the DC electrical energy, cavitation, magnetic, electrocoagulation, and hydrocycloning to effect advanced wastewater treatment. This novel and unique technology process is a major step forward in the field and provides the broadest applicability for the reduction in the concentration of organic, inorganic, gaseous and biological contaminants found in wastewater and in water supplies.

Water is the universal solvent and has been the fundamental component of industrial and petrochemical development. Within the last half century, the realization of a finite water supply has developed. Regulatory response has been the requirement for increasingly stringent treatment of water before use or release. The properties that make water a fundamental and important part of life also make it a difficult medium to purify. Contaminants can be dissolved, colloidal, suspended, emulsified or any combinations thereof.

Water forms strong intermolecular bonds due to the polarity of the molecules. These bonds hold contaminants in the solution matrix or water in the contaminant matrix. Energy must be externally applied in the form of magnetic, electrical and physical energy to destabilize such systems and free the water and, simultaneously, allow contaminants to coagulate and flocculate from solution.

As a polarized solvent, charged water particles cause ions to dissociate and become part of the solution. For example, sodium chloride (NaCl) is a solid in the absence of water. However when dissolved in water it exists in solution in the dissociated ionic form: $Na^{+1}$ and $Cl^{-1}$. Attractive forces that hold materials in the water and cause water molecules to align based on charge proximity also affect the physical properties of water. Water can absorb and hold significant amounts of energy with few changes in physical properties.

Water Treatment. Water treatment has changed little over the last century. In general the technologies have been based on chemical additions to create insoluble products from contaminants, followed by filtration to capture contaminants. Where organic components are present, biological, absorption or vapor extraction mechanisms have been added to the treatment process as appropriate. No new or dramatic approach has been brought to the industry for forty years or more since the advent of Reverse Osmosis which employs high pressure filtration. Improvements in chemicals (e.g., particularly polymers) and genetically engineered or specifically cultured biological organisms are the most common changes in process.

EMC/F technology offers a superior alternative to traditional water treatment. The EMC/F system is differentiated from typical electrocoagulation and electroflocculation treatments. To address this issue, it is critical to understand the nature of water treatment.

Contaminant chemicals in wastewater may be categorized into a number of categories. These categories are:

Organics—fat, oil, grease, hydrocarbons, solvents, petrochemicals, food products, algae, bacteria and other biological organisms, Total Suspended Solids—non-dissolved inorganic materials in colloidal suspension or dispersion; also known as TSS, and Total Dissolved Solids—chemicals of a molecular or atomic level dissolved in water and intimately associated with water molecules; also known as TDS.

Organic materials are most commonly treated through biological (bacterial) degradation followed by settling and filtration. Air (oxygen) may be provided to enhance the biological activity. Nutrients may be added to optimize the metabolism and hence the decomposition of the contaminants. Ideally, the contaminants are converted to biomass, $CO_2$ and water. The biomass is removed in the filtration step with incorporated contaminants. Organics that are not a food source to the organisms are removed from the water by mechanical means or through concentration on media that is further processed or stripped and concentrated as vapor. Low concentrations of volatile organic carbons may be removed by using diffused aeration, activated carbon filters, UV light and/or ozonation.

All processes identified require sizeable structures to accommodate flow or residency times. Current facilities represent significant capital expenditures and often receive discharges from industry that do not meet current water quality standards. Such facilities are forced to pre-treat their effluent and, in some cases, pay fees (surcharges) to discharge over the legal standards.

Total Suspended Solids ("TSS") are materials that can often be filtered from the wastewater. Filtration of large quantities of water is capital intensive and time consuming. More efficient separation can be achieved by altering the dispersion forces through centrifugation. These systems are complex and expensive. Chemicals are readily available that react with the suspended solids and/or the water to enhance the separation and removal. Chemical treatment is the mainstay of the industry and the basis for most treatment regulation. Additives function first to combine with the suspended solids and neutralize electrical charges which then allow larger particles to form that are easier to precipitate from solution. Chemicals, such as surface active agents, also are added to reduce the surface tension or polar attractiveness of the water allowing particles to move with less resistance.

Chemical treatment has advanced through the creation of new products (polymers) that react more effectively with suspended solids. Some chemical treatments leave residual materials in the water. Overdosing is often practiced to accommodate variations in the wastewater and can be a costly process.

Total Dissolved Solids ("TDS") may be treated with chemical addition but most often require additional sophisticated treatment methods after the suspended solids are removed. Clarified wastewater can be treated with ion exchange resins, mixed resin beds, microfiltration, ultrafiltration, electrodialysis or reverse osmosis. Resins are chemicals that that are used to attract and capture certain ions or molecules. Each resin is ion specific, therefore a mixture of resins is needed to react with and remove the variety of ions found in wastewater. Resins eventually become saturated and must be treated to remove the captured ions. The resin wash is a concentrated wastewater that also must be treated.

Microfiltration, ultrafiltration and reverse osmosis ("RO") are mechanical separation processes conducted under high pressure. Each utilizes specially formulated membranes that allow smaller water molecules to pass through while capturing the larger contaminant molecules. Each process then produces a concentrate stream that must be managed and disposed.

The resins and membranes will produce the highest purity water, although at a high cost. Industrial and bottled water needs are met by some combination of these techniques. De-mineralized and ultrapure water used for boiler feed, pharmaceutical production, and in chemical reactions, are produced by these techniques.

EMC/F system may be thought of as located between chemical/biological and de-mineralized/RO treatment systems. The technology is extremely efficient (>95% removal) on suspended solids and some dispersed oils and grease as well as most inorganic dissolved solids. EMC/F treatment is not appropriate for "stand-alone" treatment of alcohols, sugars, amines, amides, pesticides, herbicides, chlorinated hydrocarbon solvents and complex surfactants.

EMC/F technology will enhance most treatment systems in use and can be a powerful tool in treatment systems under design. The versatility and consistent response of EMC/F allows for a wide range of applications and less concern for wastewater consistency. Water treatment free from dosage and flow limitations or monitoring allows more flexibility of design and reduced costs of attention, maintenance, supplies, reagents, and down-time. High purity systems benefit from pretreatment by EMC/F technology. Efficient removal of most contaminants would serve to extend resin or membrane life, reduce maintenance and downtime and increase capacity of systems. Per unit costs for treated water would be reduced in these applications.

SUMMARY

One aspect of the current invention is an EMC/F wastewater treatment system incorporating a number of specific technologies that when employed collectively in series treats and removes contaminants from abroad spectrum of wastewaters. More specifically, the current invention comprises a mobile or portable water treatment process for reaction, capturing and removing total suspended solids, carbon dioxide, hydrogen sulfide, volatile organic compounds, non-volatile organic compounds, oxides and hydroxides of heavy metals, metal carbonates, dissolved solids, petroleum products or a mixture thereof from frac flowback or produced water. The system treatment process comprises a first pumping of the frac flowback or produced water through a pair of filters having inlets that are hydraulically connected to a source of frac or produced water, wherein said filters capture macroscopic debris for disposal. A second step of pumping flowback water from filters through an outlet having connection to a pair of flowlines with probes inserted into the said flowlines to monitor temperature, pH, flow and conductivity; and pumping the flowback water through a set of flowlines in hydraulic communication with a magnetic field produced by an around-the-pipe electromagnet or permanent magnet to form first reaction products of calcium carbonate crystals, aragonite produced from calcium carbonate crystals, calcite; pumping the flowback water through a divided second flowline with each division line in hydraulic connection to one of two mechanical hydrocavitation devices to initiate second reaction products from production of free radicals, including those of oxygen, hydrogen, nitrogen and carbon, initiating bicarbonate to carbonate shift resulting in the formation of insoluble calcium carbonate and magnesium carbonate, and the stripping of gases of hydrogen sulfide, carbon dioxide and volatile organic carbon compounds from the treated water. A third step of pumping the flowback water through a third flowline in fluid connection to a horizontal surge separation tank for the formation of oxides of metals and metal hydroxides, venting of gases to atmosphere, discharge of solids to drain and for equilibration of water pressure to atmospheric pressure. A fourth step of flowing the flowback water from the horizontal surge separation tank outlet into a fourth flowline, with said flowline dividing and each in hydraulic communication with one of two electrocoagulation devices to initiate the formation of fourth reaction products of electrochemically produced ferrous hydroxide and ferric hydroxide, which act as flocculants to remove reactive and non-reactive cations and anions, organic compounds, heavy metals and oil and grease and volatile organic compounds and to generate gases of hydrogen and chlorine and the hypochlorite anion. A fifth step of pumping the flowback water into a fifth flowline that is fluid communication with a horizontal atmospheric buffer tank which allows separation of gases and venting thereof to the atmosphere and separation of heavier formed solids for discharge to drain line. Subprocesses include flowing the water from horizontal atmospheric separation tank into a sixth flowline which is in fluid communication with one of two pumps; pumping flowback water via a seventh flowline which is in fluid communication with a hydrocyclone, which separates larger formed solids from the flowback water with said formed solids discharging to a horizontal drain tank while the water from the hydrocyclone is discharged into an eighth flowline, equipped with probes to monitor pH, flow and conductivity and, discharging flowback water to a flocculation/sedimentation tank (frac or frack tank) which will separate remainder of formed solids from said flowback water and removing said flowback water from the flocculation/sedimentation tank for recycle in well fracing operations.

BRIEF DESCRIPTION OF DRAWINGS

The following drawings form part of the present specification and are included to further demonstrate certain aspects of the present invention. The invention may be better understood by reference to one or more of these drawings in combination with the detailed description of specific embodiments presented herein.

FIG. 6 shows Table 1 representing treatment testing results for frac flowback water from a Barnett Shale gas well. These data show the efficacy of treatment and removal of contaminant species from frac flowback water.

FIG. 7 shows Table 2 representing results from EMC/F biocidal treatment of frac flowback water. These data demonstrate the efficacy of EMC/F as a biocidal treatment for frac source and frac flowback water.

FIG. 8 shows Table 3 representing EMC/F efficacy for treatability of various chemical constituents commonly found in wastewater.

DETAILED DESCRIPTION

Figure 1A:
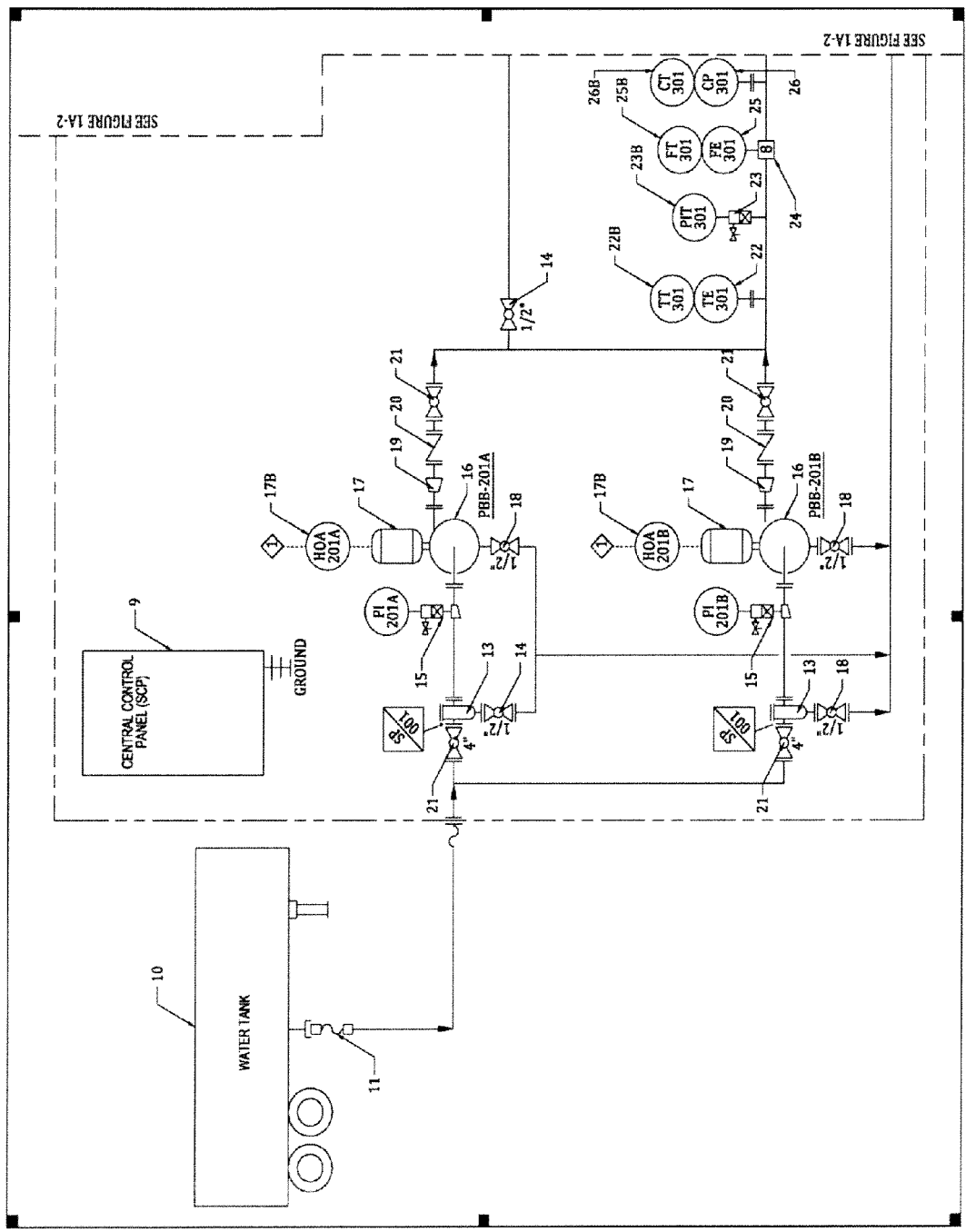
FIG. 1A-1B shows Process and Instrumentation Diagrams for the EMC/F System and illustrates three sections of the EMC/F System and the layout of the System on an approximate 40 ft. skid, wherein the electrical supply is provided by a power source located outside the System.

Terms: Before describing the present invention in detail, it is to be understood that this invention is not limited to particular apparatus, machines, compositions or composition delivery systems, which may vary. One having ordinary skill in the art will understand that the terminology used herein is for the purpose of describing particular embodiments only, and is not intended to be limiting. In addition, before describing detailed embodiments of the invention, it will be useful to set forth definitions that are used in describing the invention. The definitions set forth apply only to the terms as they are used in this patent and may not be applicable to the same terms as used elsewhere, for example in scientific literature or other patents or applications including other applications by these inventors or assigned to common owners. Additionally, when examples are given, they are intended to be exemplary only and not to be restrictive.

It must be noted that, as used in this specification and the appended claims, the singular forms "a," "an" and "the" include plural referents unless the context clearly dictates otherwise. Thus, for example, reference to "an electrolytic treatment apparatus" includes a system of two or more such machines, reference to "a base" includes mixtures of two or more bases, reference to "an acid" includes mixtures of two or more acids, and the like.

In describing and claiming the present invention, the following terminology will be used in accordance with the definitions set out below.

The terms "wastewater," "contaminated water" and "Pollutants," are typically used interchangeably herein to refer to water that is harmful for human consumption. The terms also encompass chemically acceptable, chemically active derivatives and analogs of such compositions, including, but not limited to: surface water contaminated with untreated human waste, animal waste, water born disease organisms, heavy metals organic products, petroleum, salts, esters, amides, active metabolites, inclusion complexes, analogs, and the like.

The term "Electrocoagulation" or "electroflocculation" as used herein are interchangeable and terms used to describe the utilization of electrical energy to cause the flocculation of dissolved and suspended contaminants from an aqueous medium.

The term "Hydrocavitation" or "cavitation" as used herein are the mechanically induced formation of vapor or gas filled bubbles in a liquid when tensile stress is superimposed on ambient pressure. Such bubbles upon collapse may reach temperatures of several thousand degrees Fahrenheit, sufficient to force dissolved gases from solution, catalyze the formation of free radicals and breaking of chemical bonds. Such violent treatment action of cavitation will kill most biological organisms within the water. Cavitation, therefore, serves as a form of biocidal treatment.

The term "Biocide treatment" as used herein, refers most often to a treatment performed with a variety of toxic chemicals being employed in pathogen reduction and is used to eliminate biological organisms (including pathogens and algae) from water. Pathogens would include organisms of bacteria, fungi, various worms, larvae or eggs and viruses.

Introduction to the EMC/F System. Many wastewater contaminants are held in solution due primarily to prevailing negative electrical charges on the contaminants. Bacteria, algae, oils, clays, carbon black, silica, phosphate, nickel, lead, chromate and other ions, are some examples. Neutralization of these charges and the subsequent precipitation of these contaminants can be achieved either by chemical or by electrochemical means. Electrocoagulation systems have been employed for years in the treatment of wastewater. Most rely upon high current density to produce a strong electrical field in order to disrupt the attraction of the particles, allowing suspended contaminants to co-precipitate with metal ions sacrificed or produced from system electrodes.

In the past, these systems have shown good contaminant removal compared to chemical precipitation, nevertheless, higher capital and operation costs, along with lower flow rates, have prevented widespread adoption of these systems. In today's regulatory and business environment, chemical treatment is becoming less acceptable due to more stringent regulations and increased chemical and sludge disposal costs. Solid residues may be classified as hazardous and treatment levels are more difficult to achieve. Lower operating costs, higher flow rates and better knowledge of the process have elevated ELECTROCOAGULATION to the treatment process of choice for many different wastewaters.

EMC/F SYSTEM consists of a group of devices and equipment that, when arranged and applied collectively as a process, take advantage of a selection of individual technology attributes to form an advanced technology system based on principles of physico-chemistry, including cavitation, electromagnetics, electrochemistry and hydrocyclonics, as shown in FIG. 1A to FIG. 4.

These advances are made possible by modern electronics. EMC/F SYSTEM combines these technologies and principles into a practical, compact, easy to use device. The EMC/F system's unique design effects treatment of aqueous solutions that are contaminated with a variety of materials including heavy metals, oil, grease, suspended solids, some salts and dissolved solids, as well as, bacteria, fungi and algae.

The combined cavitational, magnetic, electrochemical and hydrocyclone processes impart increased pressure and temperature changes and chemical and electrical charge changes to the waste fluid. These physical changes and electrical charges destabilize the waste fluid, causing the coagulation of many of the dissolved and suspended materials present. Destabilization is the result of the suppression of zeta forces that keep components in the water matrix dispersed. Contaminants are free to associate and coalesce or migrate to areas of high energy near the electrode surfaces. The energized components can then interact with other contaminants, particularly those of free radicals and hydrolyzed water molecules or free electrons flowing through the system. The result is a chemically altered, less soluble product capable of separation from the water.

The EMC/F SYSTEM utilizes a proprietary system that applies a cavitational force field (cavitation unit), a magnetic force field, electrochemical energy (EC unit) and hydrocylone unit to a flowing aqueous waste stream. Contaminant-laden water moves sequentially through these individual units where treatment is accomplished by the action and interaction of four basic processes:

IONIZATION. Ionization occurs due to the strong attractive forces of the anode and cathode. Alkali metals and halogens are most notably affected. Certain alkaline earths and transition metals will also readily ionize in a strong electric field. The reaction of these atoms results in separation from the water matrix and migration to one of the electrodes. In addition, significant bond stretch and subsequent weakening of the covalent forces that hold the molecule together may occur. Weakened bonds are sites for attack by other atoms or species in solution, particularly those of free radicals and oxidants. Regardless of the subsequent interactions between the contaminants, the electrodes, and or the water, ionization effects cause the destabilization of the solution and result in the formation of new compounds inside the cell and after leaving the treatment cell.

ELECTROLYSIS. Electrolysis results in the pulling apart of molecules into their elements, e.g., water into hydrogen and oxygen gasses. Often this action is much more aggressive than ionization and results in ground state atoms. Both organic and inorganic molecules are susceptible to electrolysis in the EC cells. Organic molecules generally require more energy input than inorganics. The hydrolysis of water produces intermediates that are effective in reacting with ionized atoms or attacking the stretched bonds.

Free Radical Formation. Oxygen, Nitrogen, Hydrogen, Carbon, and other elements respond to electromagnetic currents and cavitation to form free radicals. These unstable highly energized atoms are responsible for extremely aggressive compound and complex formation. The occurrence of free radicals is not common in natural waters due to the unusual energy requirements necessary to create the excited state. Free radicals may also attack certain bonds to cause the decomposition of some molecules, substitution and add-on reactions and denaturization of proteins.

Electromagnetic Fields. Electromagnetic fields have long been known to affect the electrons in atoms. The very basis of our understanding of atomic structure and chemical reactions was developed from an understanding of electromagnetic fields. The shifts in electron position or energy as a response to the electromagnetism will destabilize compounds and complexes within the aqueous medium. Destabilization leads to dissociations and alteration of the chemical equilibria in the water. Under the influence of the magnetic fields, crystalline structures may be altered (e.g. calcium carbonate) in the waste stream and are precipitated in a form that does not readily form scale (aragonite). This reaction would be of considerable importance in frac water flowback treatment and reuse since it would result in water with reduced downhole scaling potential.

Flocculation and coagulation are common to most water treatment systems. Chemical treatments generally require two or more additives and are sensitive to timing and mixing. EMC/F System incorporates an electric current in order to neutralize ionic and particulate charges thereby allowing contaminants such as colloidal particulates, oils and dissolved metals to coalesce and be removed from stable suspensions and emulsions. The principles of consideration are double layer dynamics, charge neutralization, bridging/entrapment and increased particle size. The effects are caused by the four basic processes interacting with the molecular suspended or colloidal particles dispersed in the water matrix.

Chemical reactions aid in the purification of water and are traditionally accomplished by addition of chemicals, control of pH, temperature, biological activities, or some form of external energy addition. EMC/F system accomplishes the same chemical reactions using electrical and cavitational energy applied at the electrode interface and throughout the solution in the treatment unit. Ion formation, free radical formation, dissociation, hydrolysis, crystal formation and catalyzed complex formation are just a few of the processes that are initiated by the carefully controlled application of electrical energy in EMC/F system. Inorganic minerals and compounds are most profoundly affected by these processes and are chemically altered into less soluble species. Organics may also be affected through the changes in atomic bonds through add-on and substitution reactions mediated by the electrical field and free radicals. Certain bonds are more susceptible to attack by the free radicals in the energized aqueous medium which may result in less complex and more readily processed components.

The EMC/F technology components were collectively developed and evaluated over a significant period of research and development time in an effort to minimize and optimize a large number of independent and interdependent variables associated with energy transfer, water chemistry and the phenomena described above. Each parameter was evaluated independently to determine the range of effect on certain chemical components of frac flowback water. This parameter information was individually optimized and finally incorporated into a complex system to evaluate energy transfer that would allow EMC/F to operate and treat wastewater most effectively.

The result of these efforts is an optimized process design. Understanding of the importance and the effect on treatment of each parameter allows for the standardization of critical elements in the treatment process design and the ability to adjust the remainder to the components associated with the waste stream.

EC Treatment cells for electrocoagulation systems consist of sacrificial electrodes that provide much of the treatment chemistry. Examples of typical reactions within a treatment cell include:

$$Fe^0 \rightarrow Fe^{+2}+2(OH^{-1}) \rightarrow Fe(OH)_2+Fe^{+3}+3OH^{-1} \rightarrow Fe(OH)_3 \text{(insoluble)}$$

$$Ca^{+2}+2OH^{-1} \rightarrow Ca(OH)_2 \text{(insoluble)} \quad \text{Anode:}$$

$$2H_2O \rightarrow 2H_2+O_2$$

$$2H^+ \rightarrow H_2$$

$$2Cl^{-1} \rightarrow Cl_2 \quad \text{Cathode:}$$

Ferric hydroxide is insoluble and serves as the internally generated flocculant. In addition, the hydroxides of other divalent cations of calcium and magnesium, including those of the heavy metals, react with the hydroxide to form insoluble precipitates. Examples of treatment test data for frac flowback wastewater are given in Table 1 in FIG. 6.

The number of cells in use is determined by flow demand. Cells can treat 40 to 250 gallons or more per minute depending on the wastewater treatment volume needs.

Maintenance and Operation—Each cell is continuously monitored for voltage, current, water flow, conductivity and temperature by system units within the control panel. These are the basic parameters affecting treatment of the contaminated water. Many of the system functions can be automated to reduce personnel time. Data will be logged and will be retrievable from a dedicated computing device. In addition. SCADA technology incorporation, will allow off-site monitoring of operation.

Electrical power usage is controlled by the contaminant load within the water being treated. Less power is required when the contamination level is high (high TDS) whereas, more power is required when the contaminant level is low (low TDS). This provides an efficient utilization of the energy required by the system resulting in little wasted energy.

Cavitation treatment—Cavitation treatment consists of passing the wastewater through a specially designed cavitation cell with the pump at a Total Dynamic Head (TDH) of 100 to 300 ft and more specifically of 208 ft. and providing a cavitation chamber pressure of 50 psi to 200 psi and more specifically, 90 psi to 120 psi. The ranges are not meant to be limiting but are given as examples of a useful operating range employed herein. Those actions and reactions occurring within the cavitation device include:

Pressure induced physical destruction of biological organisms (see Table 2 in FIG. 7 in Drawings and Tables Section).

Dissolved gases, such carbon dioxide, hydrogen sulfide, and volatile organics are stripped from the liquid.

Physico-chemical reaction kinetics leading to free radical formation and subsequent oxidation reactions within the waste stream.

Chemical reactions induced by cavitation which facilitate the production of the insoluble carbonates of divalent cations, including calcium and magnesium.

Magnetic treatment—Magnetic treatment of water has been shown to affect the nucleation and crystallization of calcium and magnesium carbonates. Subjecting flowing water to a specific magnetic force field can alter the predominant crystal form of calcium carbonate calcite crystal to aragonite crystal and enhance the nucleation of the crystal (see FIG. 2). The aragonite does not form a hard calcium carbonate scale as does calcite: aragonite tends to remain non-adherent, soft and feathery or powdery. This type of crystal tends to remain suspended in the fluid but flocs readily form.

Figure 5:
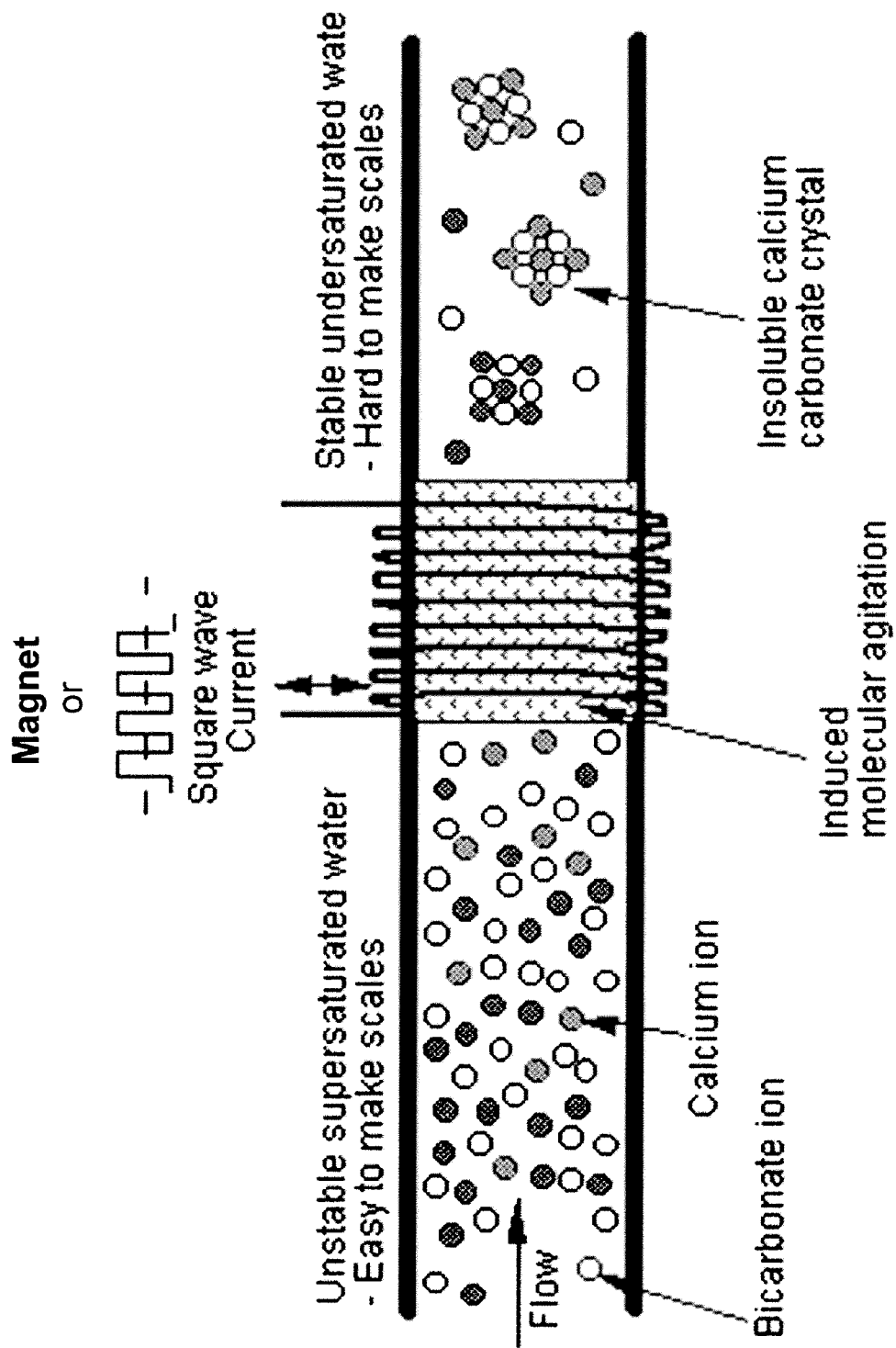
FIG. 5 shows a diagrammatic illustration of effect of magnetic force field on calcium carbonate nucleation and crystallization in flowing water.

Another important effect is on the aggregates of water molecules. Under normal conditions, water molecules are thought to be locked in aggregates in liquid water with less than 20% occurring as free water molecules. The aggregated form is thought to be due to the fact that water has a dipole moment—the hydrogen atom is attracted to the oxygen atom of the adjacent molecule. The magnetic field produces molecular agitation whose frequency is tuned to the natural frequency of water molecules vibrating in the aggregates. Through the cooperative resonance of the water molecules, free water molecules become available through breaking of the hydrogen bonds. This can result in decreased viscosity (reduced surface tension) and an increase of solutioning power of water and more readily dissolve scales and other species and reduce corrosion of piping. Such magnetic treatment of waterflood in tertiary oil production has been shown to decrease formation pressure necessary for water drive and to increase oil production. In addition to its role in wastewater treatment, magnetically treated water will provide the additional benefit of reducing the potential for downhole-scaling and corrosion of pipe associated with drilling, fracing and production activities in the oil and gas industry. For example, FIG. 5 shows a diagrammatic illustration of effect of magnetic force field on calcium carbonate nucleation and crystallization in flowing water Major Advantages of EMC/F System. Advantages of the EMC/F over other treatment systems are:

Removal of a broad range of both, organic and inorganic contaminants (see Table 1 in FIG. 6 of Drawings Section).

Toxic heavy metals in their insoluble hydroxide forms do not tend to leach, i.e., solids pass the EPA's TCLP test.

A high degree of contaminant removal is achieved, facilitating reuse of the treated water.

Floc tends to be stable and settles rapidly.

Maintenance and operation are simple.

Odor reduction or elimination due to cavitation pressure-induced evolution of noxious gases and the oxidation reactions (e.g., sulfides).

Small "footprint".

Growth easy to accommodate; due to modular design, additional units may be added to facilitate increased treatment needs.

Bacterial destruction (to non-detection levels) through cavitation pressure and the production of free radicals and disinfectants, including chlorination products and hydrogen peroxide (see Table 2 in FIG. 7 of Drawings Section).

Divalent cations (known to produce scaling) and heavy metals removal through production of their insoluble hydroxides and carbonates.

Crystal form of calcium carbonate is converted to aragonite form which is non-scale forming.

An optional programmable logic controller (PLC) providing for efficient operation.

Cost efficient when compared to other options.

Mobile operation with components located on a single skid.

The main features of the EMC/F System are as follows:

The System is user friendly, requiring minimal supervision.

Design and manufacturing costs are low when compared to competitive units of similar capacity and water quality.

Flow meters are added to provide accurate measurements of the liquid being delivered to the system, processed, or discharged as treated materials.

Ampere and voltage metering is displayed indicating the amps and volts being supplied to each treatment cell within the unit.

Individual treatment cells are easily replaced without the need for unit shutdown.

An optional programmable logic controller ("PLC") provides back pressure safeguards alerting to the blockage or unexpected wear on the EMC/F system and providing for automatic shut down in the event of failure of any part of the system. In addition, process variables of flow rate and power can be optimized and quality parameters of pH, TDS, and conductivity can be continuously monitored.

EXAMPLES

The following examples are provided to further illustrate this invention and the manner in which it may be carried out. It will be understood by one of ordinary skill in the art, however, that the specific details given in the examples have been chosen for purposes of illustration only and not be construed as limiting the invention.

Example 1

One aspect of the current invention is an EMC/F wastewater treatment system incorporating a number of specific technologies that when employed collectively in series treats and removes contaminants from a broad spectrum of wastewaters. The system includes the following components arranged in series: a hydrocavitation unit, an electromagnetic unit, an electrocoagulation unit and a hydrocyclone unit and/or a flocculation-sedimentation tank. The system has been designed to optimize process variables via an optionable programmable logic controller ("PLC") in order to effectively transfer hydrodynamic, electrical and electromagnetic energy to the continuously flowing contaminated waste water. Water-contaminant mixtures treated by an EMC/F system will separate into an organic floating layer, a mineral-rich sediment layer and a clean water layer in the middle. This separation occurs within minutes of treatment and conventional equipment (flocculation-sedimentation tank and filtering, if needed) may be used to extract the clean water for reuse or discharge.

The invention is a multi-component device that can be applied to a broad spectrum of water and wastewater treatment requirements. The technology is most applicable to separation of inorganic contaminants, biological contaminants, and <2% petroleum hydrocarbons. EMC/F is not appropriate for solvents, sludge, complex amines, sugars or alcohols as a standalone treatment system. In combination with other technologies, such as RO for desalination, the system may be employed to produce significantly higher quality water for reuse or discharge. The EMC/F system also lends itself to treatment of complex mixed wastewater streams and as a pretreatment to increase efficiency of other purification and desalination systems.

The system has been successfully operated in a number of different applications. Treatment of shale gas frac water flowback for reuse and plating plant wastewaters have been treated successfully. As shown in Table 1 of FIG. 7, reductions in divalent cations, some salts, heavy metals, oil and grease, BTEX, TSS, TDS, sulfides, and sulfates were highly significant. The particular wastewaters treated here are not exclusive to those industries cited but only serve as examples. Treatment may be extended to include other industrial wastewaters as would be recognized by anyone schooled in the art.

Bacterial reduction or preferably complete elimination from water for use or reuse in drilling operations is highly desirable since bacteria, entering downhole formations with water for drilling or hydraulic fracing can reproduce within the formation and result in fouling of wells. This is particularly true for Acid Producing Bacteria ("APB") and Sulfur Reducing Bacteria ("SRB"). The EMC/F technology is a "Green Technology". It destroys bacterial organisms through physical, electrical and free radical actions. It will benefit drilling and fracing operations by reducing the need for use of toxic biocidal chemicals used by the oil and gas industry and currently the subject of considerable concern and controversy relating to potential contamination of potable groundwater aquifers and contamination of surface supplies due to surface spills.

EMC/F system is a chemical-free technology that relies on electro-mechanical action for treatment to achieve a Non-detect level (below detection limit, see Table 2 in FIG. 7) of bacterial organisms encountered in source water for drilling and fracing and for treatment of frac flowback wastewater for reuse.

Treatability studies have been performed on a number of different waste-waters. The EMC/F system has demonstrated efficacy in treatment of a broad spectrum of chemical and physical contaminants as shown in Table 3 in FIG. 8.

Many varying and different embodiments may be made within the scope of the inventive concept herein taught, and because many modifications may be made in the embodiments herein detailed in accordance with the descriptive requirements of the law, it is understood that the details herein are to be interpreted as illustrative and not in any sense limiting.

The EMC/F System is portable and designed for field use. The system is not, however limited to portable field use but may also be placed on a fixed site.

The EMC/F System is novel and comprised of four separate water treatment technologies, including 1) hydrocavitation unit, 2) electromagnetic unit, 3) electrocoagulation unit and 4) hydrocyclone unit, all connected in series with each unit performing a different treatment task.

Arrangement of the individual treatment technologies in series may be varied in order to accomplish different treatment needs and all such possible arrangements and sequences are claimed. This characteristic accomplishes what other systems lack, adaptability as discussed above.

The EMC/F System is modular and mounted on a 40 ft. skid for ease of loading and unloading at a site.

The EMC/F System is a dynamic flow-through system and has a volume throughput of up to 250 gallons per minute and is large when compared to other portable industrial wastewater treatment systems.

The EMC/F System as described is modular in design and can accommodate larger treatment volumes by adding additional modules, thus increasing adaptability.

The EMC/F System as described allows for repetitive cycling of water in the treatment process, thus increasing treatment efficiency.

The EMC/F is a "Green Technology" which in this sense asserts that the system does not require the addition of chemicals to operate properly in the treatment of wastewater for purposes of reuse or discharge.

As a result of the fact that this is a green technology, there are no hazardous wastes generated in the process and no toxic waste requiring disposal.

The EMC/F System operation, as well as individual unit operation, may be optimized by an optional programmable logic controller ("PLC") to provide back pressure safeguards alerting to blockage or unexpected wear on the EMC/F System components, thus providing for automatic shut down in the event of failure of any part of the system. In addition, process variables of flow rate and power can be optimized and continuously monitored. This feature allows for increased efficiency of system operation and lower treatment costs.

Example 2

Turning now to FIG. 1A, power to all system components is regulated through a Central Control Panel (9). Water is pumped from a water holding tank (10) at 40 to 250 gpm and enters the treatment system train. The water passes through a flexible flowline (11) with a shutoff valve (21) and through one of two $\frac{1}{32}$ in. in-line screen filters (13) to remove larger debris. The filters are equipped with one-half in. ball valves (14 and 18) which are connected to a discharge line (39) for discharge of accumulated debris which passes through the filter.

The water then passes from the filters through the flowline where the flowline pressure is monitored by a pressure gauge (15). The water enters one of two centrifugal pumps (16) equipped with monitoring gauges for flow (17) and (17B). Upon exit from the pumps, the flowline changes in diameter from 3 in. to 4 in. (19), past a check valve (20) and a 4 in. ball valve (21). The pumps are equipped with a one-half in. ball valves (18) for discharge of accumulated debris that is also connected to the discharge line (39). The water then flows past probes that are inserted to monitor temperature (22), pH (23), flow (24) and (25), and conductivity (26) of the water. The monitoring gauges for the probes are shown as (22B), (23B), (25B) and (26B), respectively.

From this point the flowline is reduced in diameter by (19) from 4 in. to 3 in. The water flows through an electromagnetic field provided by an around-the-pipe 4 in. by 36 in. electromagnetic conditioning tube (28), located on a dielectric insert section of the pipe. The force field is established at 2500 to 7000 gauss and regulated by (27) at the center point of the insert-pipe. This magnetic force field has been determined to have the maximum direct effect on calcium carbonate crystal form within the flowing water. The predominant crystal form shifts from calcite to aragonite under the force field stated above, which in aragonite form is resistant to scaling. This reduces scaling and build-up of calcium carbonate on the electrodes within the EC Unit and in turn, reduces maintenance time and costs associated with electrode treatment or replacement. In addition, downhole scaling potential of the water is reduced upon reuse in fracing. The flowline diameter is increased to 4 in. (19) after passing the electromagnetic device. The flow pressure is adjusted to 150 psi by the in-line pressure regulator (29).

The water is then pumped into one of two in-line 3 in. by 6 in. chamber hydrocavitation units (35), as described by Kelsey et. al. USPTO U.S. Pat. No. 7,651,614, incorporated herein by reference, at a total pressure of 175 psi. Prior to entry, the divided flowlines are equipped with 4 in. shutoff valves (21) for use in service of the hydrocavitation units. This allows either unit to be isolated for service. Both units are open during normal operation. Upon entry into the hydrocavitation unit, the water divides into two streams. The streams are forced through opposing eductors, colliding midway between the two. The cavitation chamber pressure is fixed at 90 psi and monitored by (36), (38) and (38B). The units are provided with one-half in. drains (18) to discharge solids into the drain line (39). Upon collision of the two streams, very small bubbles form and implode under the formation of a vacuum created in the chamber. Implosion of the bubbles liberates significant energy in the form of heat (estimates have been made that such imploding bubbles may reach temperatures as high as 90000 F). Such violent collision and high temperatures will destroy most biological organisms within 2 radii of the bubble and force dissolved gases from the water stream, including carbon dioxide, hydrogen sulfide, and volatile organics. In the case of carbon dioxide evolution from the bulk liquid, a pH shift to alkaline follows. This shift is due to the bicarbonate—carbonate equilibrium shift to carbonate. The carbonate ions react with calcium and magnesium ions to form the respective carbonates and, if solubility constants are exceeded, precipitation of calcium carbonate and magnesium carbonate ensues. This precipitate is removed during later stages of treatment. Implosions can catalyze other chemical reactions and create energetic free radicals, hydrogen peroxide and hypochlorite ion which in turn, react with other chemical species to break chemical bonds and alter organic and inorganic species within the bulk liquid. These reactions serve to destabilize colloids and reduce the zeta potential of the liquid. Destabilization and zeta potential reduction are necessary for later flocculation and sedimentation of insoluble contaminants. Any precipitated solids which do form in this section are discharged to the drain system (39) as discussed below.

Water from the hydrocavitation units passes a pressure regulator (34) which reduces the pressure to 25 psi. The water then enters an elevated 36 in. diameter by 72 in. long horizontal surge separation tank (33). This accomplishes two things: (1) evolved gases of hydrogen, carbon dioxide and other gases are vented from this tank to vent lines (58) which discharge to the atmosphere and (2) the necessary hydraulic head for feed water to the next section of the system is obtained. Tank pressure and water level are monitored by instrumentation (31) and (32). Water from (33) flows by way of (35B) to one of two Electrocoagulation Units FIG. 1B (43) as described below. Sediment and formed solids from the tank are discharged via (36) to the drain line (39).

Figure 1B:
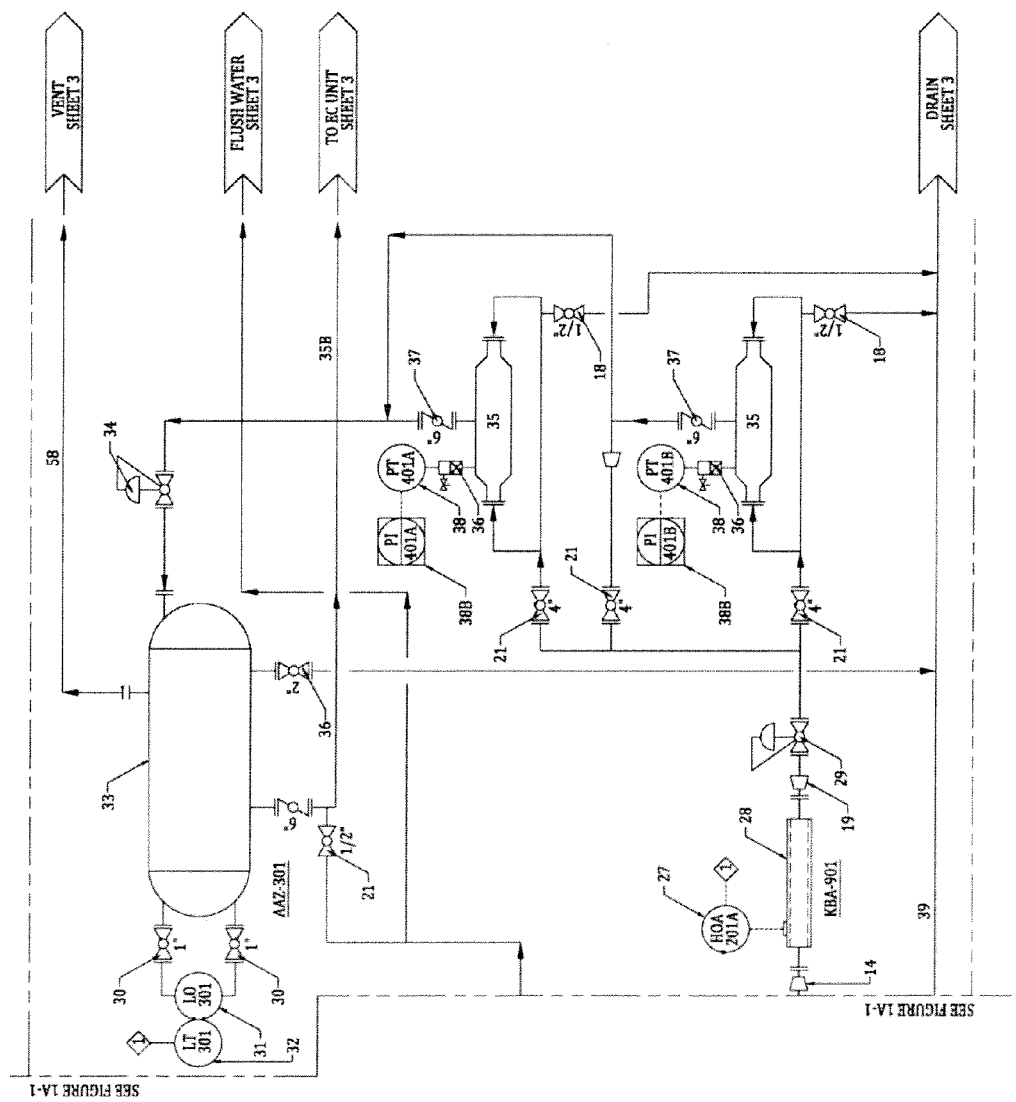

FIG. 1B illustrates the path of water entering the next section of the treatment train. The entering water stream (35B) divides into two streams flowing at 125 gpm each as regulated by 2 in. ball valves (36). These valves also allow the reactors to be isolated for maintenance purposes and flow to bypass the reactors. Each of the two streams flows into one of two Electrocoagulation Reactors (43), as described by Hermann et al. in USPTO U.S. Pat. No. 6,780,292, incorporated herein by reference. Flow to and from each reactor is via flowlines (35B). Power level is adjusted by control switch (40) and water temperature is monitored by instrumentation (41). Electrical power is supplied to each reactor from off-skid power rated for 150 amps at 220 volts (45) each. The water flows between iron anodes and cathodes within the reactors. In doing so, iron in the form of ferrous and ferric ions is produced from the anodes. These ions react with hydroxyl ions, also produced within the water. These ions react to form insoluble precipitates of ferrous and ferric hydroxide. Additional reactions occur to form other insoluble species, including hydroxides of various cations and those of heavy metals. Cathodic reactions include the production of hydrogen and chlorine gases. A portion of the chlorine gas may ionize to form the hypochlorite ion which serves as a disinfectant. Free gases from the cathodic reaction are vented to the atmosphere via vent line (59). Insoluble precipitates from the system are routed to drain (39). Upon leaving the reactors, the water passes 4 in. butterfly valves (42) which prevent backflow to the reactors and passes to the flowline (35B). The water then enters a 35 in. diameter by 84 in. long horizontal atmospheric buffer tank (44). Tank pressure and water level are monitored via instrumentation (31) and (32). This tank is vented to the atmosphere via vent line (58). Accumulated solids within this tank are discharged to drain (39). The treated water is pumped from the holding tank via 6 in. flowline (35B). Inserted into the line is a pressure gauge (15) to monitor pressure within the line. The water then flows to a downstream point where the flowline is divided onto two streams by 4 in. flowlines. Each flowline has a 4 in. ball valve inserted to allow flow or shut off flow to each of two spared ANSI Centrifugal Pumps, rated at 1800 rpm and 250 gpm (46). The redundancy of pumps allows service to one or the other in case one pump fails. Associated pump components (47), (47B), (18). (19), (20) and (21) are the same as previously described above. Water flows from the pumps by flowlines (35B) and passes to the separator section. FIG. 1C.

FIG. 1C illustrates the separator section of the treatment train. Water is pumped from the previous section, via line 35 and enters a 24 in. by 36 in. hydro-cyclone type separator Unit (49). The hydrocyclone function is to remove any large accumulation of heavy precipitate that has previously formed as a result of electrocoagulation treatment. The solids are discharged through a 3 in. valve (50) located on the bottom of the hydrocyclone. The valve is self-actuating (52) as a function of conductivity and pressure metering by (26) and (26B), respectively. In addition, aeration of the water by the hydrocyclone facilitates the oxidation of any remaining ferrous ion to ferric ion, which is less soluble. Insoluble solids which fall out of solution are discharged to a 24 in. diameter by 48 in long horizontal holding tank (51). Pressure and tank fluid level are monitored by (30), (31) and (32). The drainage from this tank enters the flowline (57) for discharge. Pumps (54), with associated monitoring instrumentation (55) and (55B) and associated flow controls (18), (20), and (56), move the sludge to the discharge flowline (61). Drainage from the flowline (57) and drainage from the skid (61) are collected into a tank for off-site disposal. The treated water is pumped into the cleaner water flowline (35B) and passes inline monitoring probes for temperature, flow, and conductivity (23), (23B), (24), (25), (25B), (26) and (26B). The cleaner water discharges via (35B) and (11) into a three-section, 500 barrel flocculation/sediment formation tank (60). The water is treated by conventional flocculation and sedimentations methods in this tank. The water first enters the separation section where much of the settleable solids flocculate and precipitate out of the water. The water then flows into the next section which contains settling tubes, which facilitate the precipitation of finer settleable solids. The water flows from the second section into the final section for polishing. Upon completion of movement through the tank, the clean water is removed and stored or reused in fracing operations. If necessary or required, the water may be filtered after passing through the flocculation-sedimentation tank. Additionally, the water may be treated by reverse osmosis to further reduce dissolved solids.

Settleable solids which accumulate as tank bottoms are periodically removed by pneumatic tanker truck and disposed off-site.

The EMC/F Wastewater Treatment System, as described herein, can be employed to treat frac water but additionally, can be used to treat produced water from oil and gas drilling industry, as well as, other industrial wastewaters.

Figure 2:
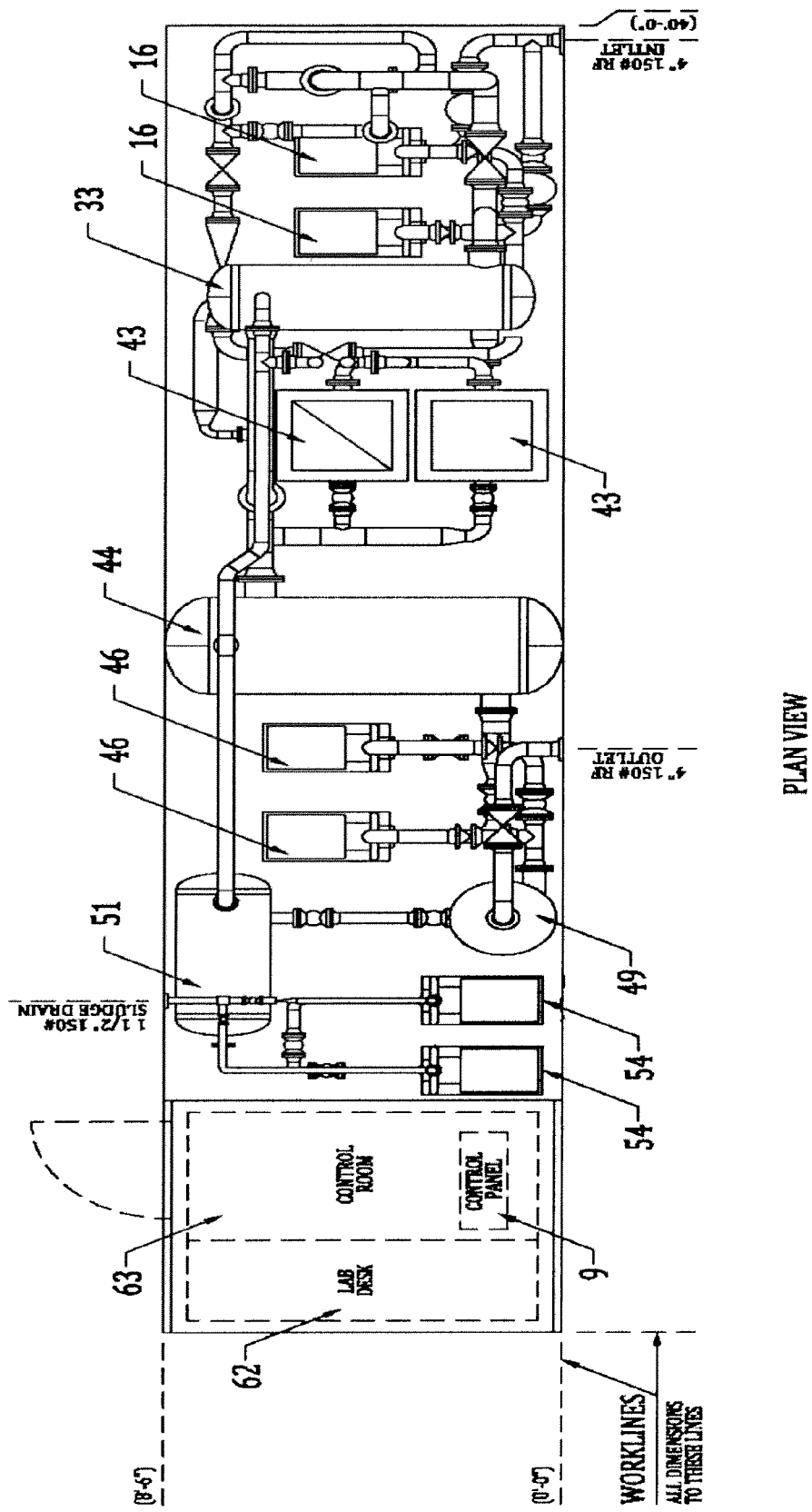
FIG. 2 shows a Plan View and layout of the EMC/F System.

FIG. 2 represents the Plan View of the complete EMC/F Unit mounted on a skid. The skid dimensions are 40 ft. (length)×11.5 ft (height)×8.5 ft (width). Water enters the system at the 4 in. inlet and passes through one of two pumps (16). Then the water passes through the magnetic field and into one of two cavitation devices (not shown in this view). From the cavitation devices, the water is pumped (16) into the horizontal surge tank (33). The water then flows via flowline (35B) into one of two Electrocoagulation cells (43). Device 44 is a horizontal atmospheric buffer tank which collects gases from the EC cells for discharge to the atmosphere and also serves as a tank for the treated water. The water flows from this tank to one of two duplicate pumps (46) which pumps the water to the hydrocavitation Unit (49). Sediment and precipitate discharge into tank (51) which discharges to sludge drain. Water is pumped (54) from the system via the 4 in. outlet drain line (11) and passes to the Frac Tank (60) for flocculation/sedimentation. The Control Room is shown in (63) with the Lab Desk (62) and Control Panel (9) located within.

Figure 3:
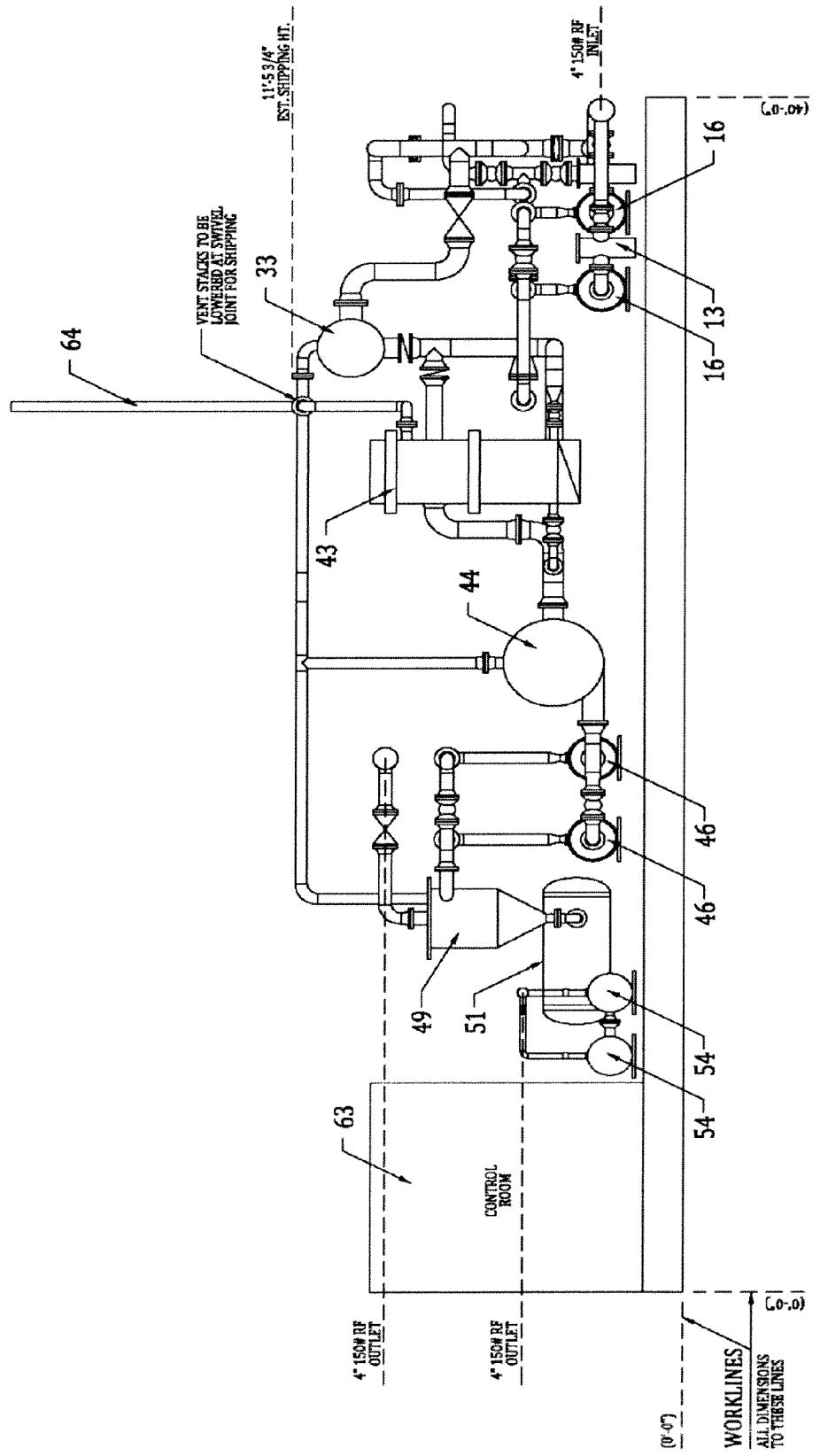
FIG. 3 shows an Elevation View and layout of the EMC/F System.

FIG. 3 represents the Elevation View of the complete EMC/F Unit on the skid. All component numbers are as given previously in the above figures, with the exception of (64) which is the atmospheric discharge line for gases generated within the treatment system.

Figure 4:
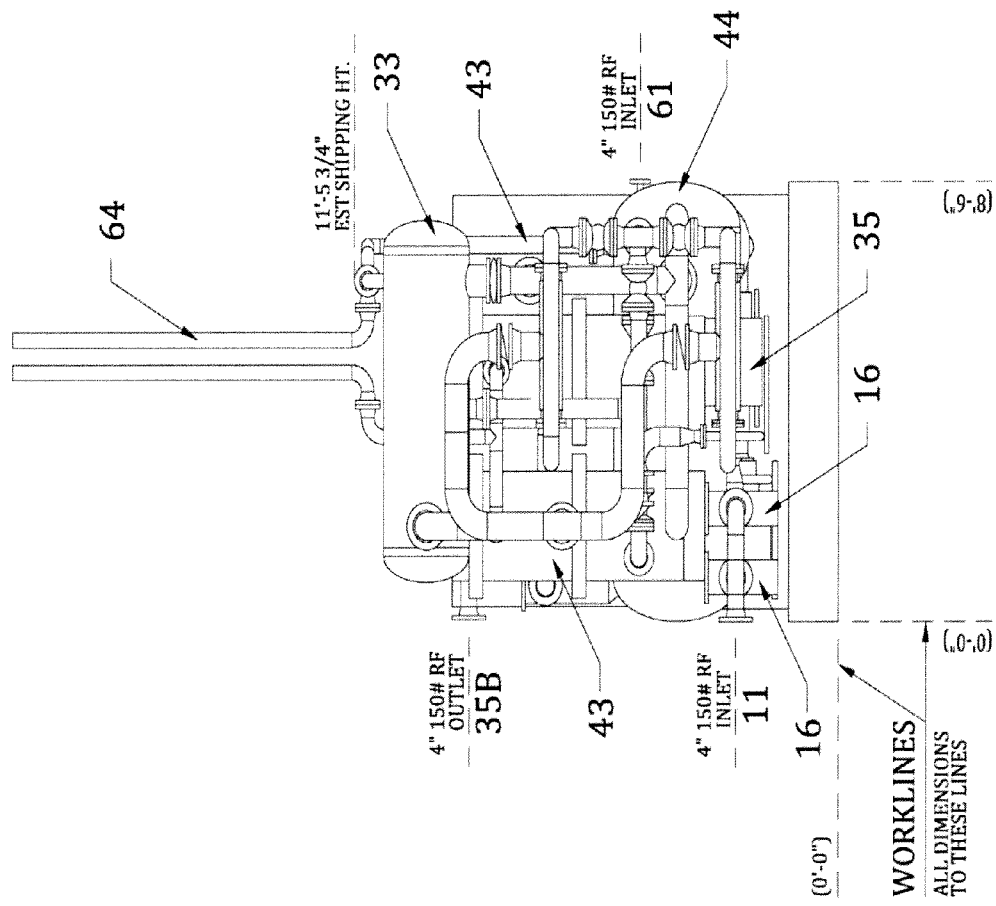
FIG. 4 shows an End View and layout of the EMC/F System.

FIG. 4 represents the End View of the complete EMC/F Unit on the skid. All component numbers are as given previously in the above figures.

Table 1 in FIG. 6, represents treatment testing results for frac flowback water from a Barnett Shale gas well. These data show the efficacy of treatment and removal of contaminant species from frac flowback water.

Table 2 in FIG. 7 in FIG. 8, represents results from EMC/F biocidal treatment of frac flowback water. These data demonstrate the efficacy of EMC/F as a biocidal treatment for frac source and frac flowback water.

Table 3 in FIG. 8 represents EMC/F efficacy for treatability of various chemical constituents commonly found in wastewater.

REFERENCES

U.S. Pat. No. 7,651,614 issued on Jan. 26, 2010, titled "Methods for treatment of wastewater," having Kelsey, et al., listed as inventors.
U.S. Pat. No. 6,780,292 issued on Aug. 24, 2004, titled "Electrolytic treatment apparatus having replaceable and interchangeable electrode reactor cartridges therefore", having Hermann, et al., listed as inventor.
The Future of Water, Discover Science, Technology and the Future, pp. 50-53, December 2011

What is claimed is:

1. A mobile or portable water treatment process for capturing and removing suspended and dissolved solids, carbon dioxide, hydrogen sulfide, volatile and non-volatile organic compounds, oxides and hydroxides of heavy metals, metal carbonates, petroleum products, or a mixture thereof from frac flowback or produced water, comprising:
  a) pumping the frac flowback or produced water through a pair of filters having a plurality of inlets, the inlets being hydraulically connected to a source of the frac flowback or produced water, wherein the filters capture macroscopic debris for disposal giving a filtered flowback water;
  b) pumping the filtered flowback water from the pair of filters through an outlet having a connection to a pair of first flowlines with probes inserted into the flowlines to monitor temperature, pH, flow, and conductivity;
  c) pumping the filtered flowback water through the pair of first flowlines, wherein the pair of first flowlines is in hydraulic communication with a magnetic field produced by an around-the-pipe electromagnet, or by a pet anent magnet, to give a second flowback in water;

d) pumping the second flowback water through a divided second flowline having two or more divided lines wherein each divided line is in hydraulic connection to one of two mechanical hydrocavitation devices to produce a treated second flowback water;

e) pumping the treated second flowback water through a third flowline in fluid connection to a horizontal surge separation tank having a horizontal surge separation tank outlet to give a third flowback water;

f) flowing the third flowback water from the horizontal surge separation tank outlet into a fourth flowline, wherein the fourth flowline has two or more divided lines and each divided line is in hydraulic communication with one of two electrocoagulation devices to give a fourth flowback water;

g) pumping the fourth flowback water into a fifth flowline which is in fluid communication with a horizontal atmospheric separation tank to give a fifth flowback water;

h) flowing the fifth flowback water from the horizontal atmospheric separation tank into a sixth flowline to give a sixth flowback water, wherein the sixth flowline is in fluid communication with one of two pumps;

i) pumping the sixth flowback water via a seventh flowline to give a seventh flowback water, wherein the seventh flowline is in fluid communication with a hydrocyclone;

j) discharging the seventh flowback water via an eighth flowline to a flocculation/sedimentation tank separating any remaining formed solids from the seventh flowback water, said eighth flowline equipped with probes to monitor pH, flow, and conductivity; and k) removing the seventh flowback water from the flocculation/sedimentation tank for recycle in well fracing operations.

2. The process of claim 1, wherein the filtered flowback water contains calcium carbonate crystals in the form of calcite such that pumping the filtered flowback water through the magnetic field causes the formation of a first reaction product by converting calcite to aragonite.

3. The process of claim 1, wherein the second flowback water s treated by mechanical hydrocavitation, such that:
a) free radicals are introduced to the second flowback water to produce hydrogen peroxide and energetic free radicals of oxygen, nitrogen, hydrogen, and carbon;
b) oxides of alkaline metals and heavy metal hydroxides are formed;
c) a shift in bicarbonate:carbonate equilibrium occurs, such that carbonates and insoluble metal carbonates are produced;
d) oxidized organic matter is produced;
e) gases of carbon dioxide and hydrogen sulfide and volatile organic compounds are stripped from the water; and
f) biological organisms are physically destroyed.

4. The process of claim 1, wherein the treated second flowback water is pumped to the horizontal surge separation tank wherein:
a) solids of metal carbonates and hydroxides form;
b) free gases of carbon dioxide, hydrogen sulfide, and volatile organic carbons are vented to the atmosphere;
c) water pressure is reduced to atmospheric pressure; and
d) solids are discharged to a drain system.

5. The process of claim 1, wherein the third flowback water is introduced into the one of two electrocoagulation devices, wherein:
a) electrical power to iron electrodes produces reaction products of ferrous ion and ferric ion and hydroxyl ion, and wherein the ferrous ion and the ferric ion react with the hydroxyl ion to produce insoluble ferrous and ferric hydroxides, such that:
  i) the hydroxides act as flocculant to remove reactive and non-reactive cations and anions, organic compounds, and oil and grease;
  ii) the hydroxides react with heavy metals to form heavy metal hydroxides, and the heavy metal hydroxides are removed by the flocculant; and
b) electrical power to the iron electrodes produces free radicals of oxygen, hydrogen, nitrogen and carbon which oxidize other compounds and are removed by the flocculant; and
c) electrical power to the iron electrodes generates gases of hydrogen, chlorine and hypochlorite ion whereby the chlorine and the hypochlorite ion serve as biocides.

6. The process of claim 5, wherein the fourth flowback water is in fluid communication with the horizontal atmospheric buffer tank, such that:
a) the gases of hydrogen, chlorine, and hypochlorite are separated and vented to the atmosphere; and
b) the flocculant, organic compounds, oil, grease, and heavy metal hydroxides are separated and discharged to a drain system, and
c) pressure is maintained at atmospheric pressure.

7. The process of claim 1, wherein the sixth flowback water is pumped to and enters a hydrocyclone device, wherein:
a) larger and heavier formed solids from the flowback water are separated by centrifugal force and discharged to a horizontal drain tank, and
b) the seventh flowback water is discharged from the hydrocyclone via the eighth flowline.

8. The process of claim 1, whereby the seventh flowback water enters by inlet into the flocculation/sedimentation tank, wherein the seventh flowback water passes sequentially through three sections of the flocculation/sedimentation tank, comprising:
a) a separation section where larger and heavier floc and sediment precipitate out of the water volume to a tank bottom;
b) a tube section wherein the tube section is fitted with a series of tube settlers to facilitate precipitation of smaller and lighter floc and sediment particles to the tank bottom; and
c) a polish section wherein the smallest and lightest particles are removed and precipitate to the tank bottom.

9. The process of claim 8, wherein the seventh flowback water is passed through an outlet for subsequent storage or reuse in well drilling operations.

10. The process of claim 1, wherein the electromagnet or permanent magnet provides a magnetic field of 2500 to 7000 gauss as measured at the center point of the flowline.

11. The process of claim 1, wherein the flocculation/sedimentation tank is a standard 500 bbl tank.

12. The process of claim 4, wherein the solids are concentrated waste solids and are injected into a disposal well or disposed in a regulated landfill.

* * * * *